March 3, 1936.   O. J. CRAWFORD ET AL   2,032,472
ALTERNATING TAILLIGHT AND SIGNAL
Filed Dec. 27, 1934    2 Sheets-Sheet 1
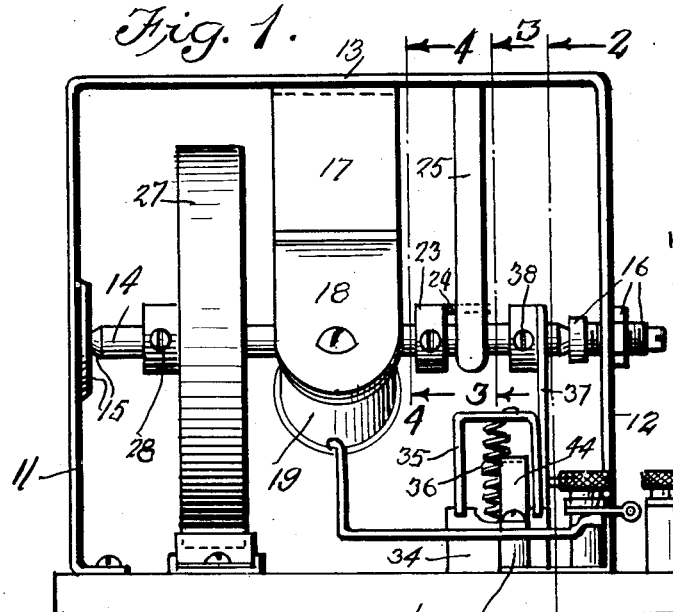
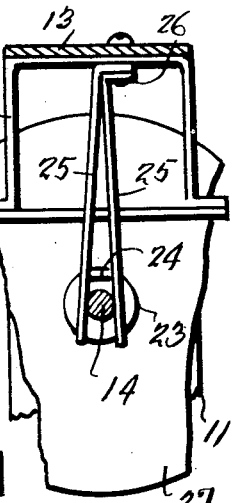
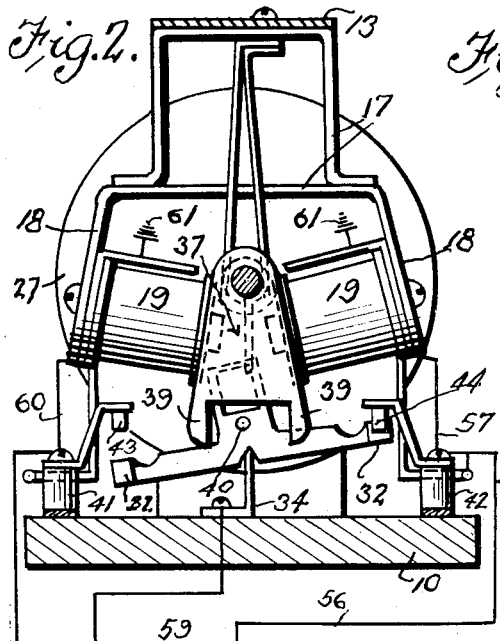
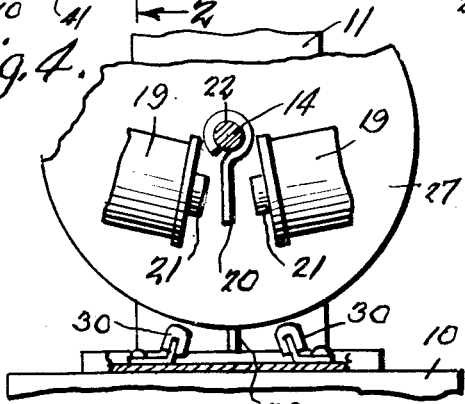
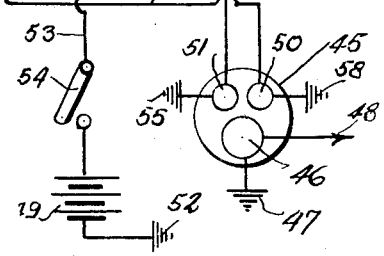
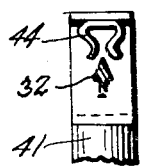
Inventors
Oscar J. Crawford
& James W. Brown.

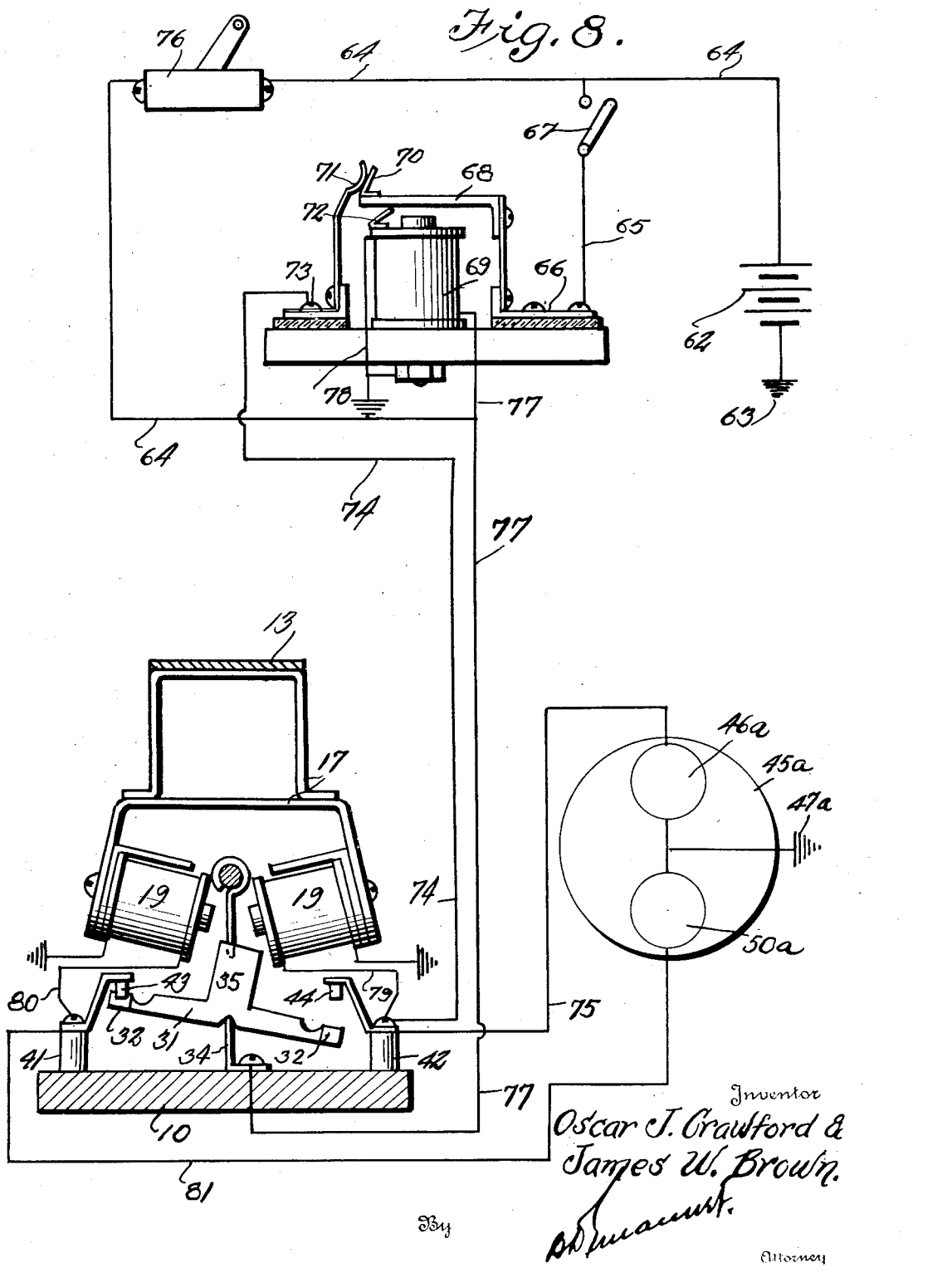

Patented Mar. 3, 1936

2,032,472

UNITED STATES PATENT OFFICE 2,032,472

ALTERNATING TAILLIGHT AND SIGNAL

Oscar J. Crawford and James W. Brown, Anderson, Ind., assignors of one-third to Ralph E. White, Anderson, Ind.

Application December 27, 1934, Serial No. 759,415

2 Claims. (Cl. 177—337)

This invention relates to certain new and useful improvements in alternating tail lights and signals.

The primary object of the invention is to provide a signal light and operating means therefor especially designed for use in connection with motor vehicles to indicate proposed changes in direction of travel and the stopping of the motor vehicle, the signal embodying a pair of lights adapted to be alternately flashed for quickly attracting attention thereto, the two alternately flashing signal lights being in addition to the usual tail light and closely associated therewith as by being located in the same signal box.

It is a further object of the invention to provide an alternating tail light and signal especially designed for use in connection with motor vehicles and embodying the usual tail light, the illumination of which is controlled by a manually operated switch and a signal light associated with the tail light with both the signal light and tail light rendered alternately operable for flashing during application of the motor vehicle brakes.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of a part of the apparatus for effecting alternate illumination of two flashlight lamps;

Figure 2 is a vertical cross-sectional view taken on line 2—2 of Figure 1, showing two solenoids alternately energizable with a single armature therebetween for effecting closing movement of the contact elements for the alternate illumination of the lamp, the source of electrical energy, the lamps and the circuits therefor;

Figure 3 is a detail sectional view taken on line 3—3 of Figure 1, showing the spring device associated with the shaft carrying the balance wheel and armature for centering the armature and balance wheel when the current is off;

Figure 4 is a detail sectional view taken on line 4—4 of Figure 1, showing the two solenoids with the single intermediate armature and the balance wheel with the stops for limiting movements thereof;

Figure 5 is a front elevational view of the pivoted contact member adapted to be operated by the armature and the spring associated therewith for maintaining the contact member in an off-center position when the current is off;

Figure 6 is a side edge elevational view of the contact member;

Figure 7 is a fragmentary elevational view, partly in section of one end of the pivoted contact member and the contact cooperating therewith; and Figure 8 is an elevational view, partly in section illustrating devices for effecting alternate illumination of a regular tail light and stop light.

Referring more in detail to the accompanying drawings, and particularly to Figures 1 to 7, electrical devices mechanically controlled in their operation are illustrated to effect the usual illumination of an automobile tail light and the alternate flashing or illumination of a pair of stop lights, the electrical devices and appurtenances including a mounting base plate upon which a frame including end legs 11 and 12 and a top bar 13 is suitably mounted. A shaft 14 is rotatably supported in the end legs 11 and 12 by means of a point bearing 15 associated with the leg 11 and an adjustable bearing 16 associated with the leg 12.

A bracket construction 17 is supported by and centrally depends from the top bar 13 of the frame and includes a pair of divergent downwardly extending legs 18 with a solenoid 19 carried by each leg 18 at the inner side thereof with the adjacent ends of the solenoids spaced from each other as clearly illustrated in Figures 2 and 4. A single armature 20 is disposed between the cores 21 of the two solenoids 19 and is fixed as at 22 to the shaft 14.

When the solenoids 19 are de-energized, the armature 20 moves to and remains at a point midway the two armatures by means of devices shown more clearly in Figs. 1 and 3 and comprising a collar 23 fixed to the shaft 14 adjacent the solenoid and carrying a lateral lug 24 disposed between a pair of leaf springs 25 that are anchored at corresponding ends as at 26 to the top bar 13 of the frame.

The shaft is also provided with a balance wheel 27 that is secured thereto as at 28 at the side of the solenoids 19 opposite the collar 23 for limiting oscillatory movements of the shafts. As shown more clearly in Figure 4, a lug 29 projects peripherally of the balance wheel 27 and moves between a pair of cushioned stops 30 carried by the base plate 10.

Electrical contacts controlled in their operation by oscillatory movements of the shaft 14 influenced by the armature 20 and the solenoids 19, include a pivotally supported contact bar 31 having a spear-head contact 32 on each end thereof with the bar 31 notched at its underside midway its ends as at 33 for the pivotal mounting and support on the upper end of an angle bracket 34 carried by the base plate 10. A frame 35 rises above the contact bar 31 and a coil spring 36 attached to the upper end of the frame and to the contact bar is so mounted thereon as to cause the contact bar 31 to assume a tilted position at either side of the pivot when the solenoids 19 are de-energized. Tilting movement of the contact bar 31 is effected by means of the arm 37 fixed as at 38 to the shaft 14 with the lower end of the arm 37 bifurcated to provide a pair of spaced lugs 39 between which a pin 40 carried by the contact bar 31 extends. A pair of terminal posts 41 and 42 are mounted on the base plate 10 respectively adjacent the ends of the contact bar 31 and carry spring clip contacts 43 and 44 respectively disposed above the contacts 32 on the contact bar 31.

The signal embodies a lamp casing 45 carrying the usual tail light 46 grounded as at 47 and having a wire connection 48 with the source of energy or battery 49 and controlled by the usual manual switch. The lamp casing 45 also contains a pair of stop lights 50 and 51 that are adapted to be alternately illuminated or flashed by the mechanism hereinbefore described. The battery 49 is grounded as at 52 and the conductor 53 from the other terminal of the battery has a switch 54 set therein and in communication with the angle bracket 34 that is in electrical contact with the contact bar 31 upon which the latter is pivotally supported. The lamp 51 is grounded as at 55 and has a conductor 56 extending to the terminal post 42, a wire 57 from the terminal 42 being in communication with the adjacent solenoid 19. The other stop light 50 is grounded as at 58 and has a wire connection 59 with the terminal 41 and said terminal has a wire connection 60 with the adjacent solenoid 19. The two solenoids 19 are grounded as at 61.

The tail light 46 is of the standard type being in communication with the battery 49 and switch controlled in the usual manner. The switch 54 in the conductor 53 is mechanically connected to the brake mechanism of the motor vehicle and upon application of the brake the switch 54 is closed for completing the circuit from the battery 49 to the pivotal contact bar 31 and when the latter is in the tilted position shown in Figure 2, under influence of the spring 36, the contact at the end of the contact bar 31 engages the contact 44, the current flowing over the wire 56 to the stop light 51 and to ground for return to the battery. Current also flows through the wire 57 to energize the adjacent solenoid 19 for the attraction to the core thereof of the armature 20. Such movement of the armature 20 effects rotation of the shaft 14 which is rotated against the tension of the spring and lug device 24 and 25 and are balanced by the wheel 27, the shaft 14 swinging the arm 37 to cause one of the lugs 39 to engage the pin 40 for moving the contact bar 41 on its pivotal support for separating one contact 32 from the contact 44 and causing engagement of the other contact 32 with the contact 43. Such movement de-energizes the previously active solenoid 19 and effects energization of the other solenoid, and the illumination of the lamp 50 and the circuit to the lamp 51 is broken. As long as the mechanism remains in applied position, current continues to alternately flow to the lamps 50 and 51 for alternate flashing thereof, under control of the mechanism described. When the brake mechanism is released, both solenoids 19 are de-energized, the shaft 14 centered and the contact bar 31 assumes a tilted position by the spring 36 with one of the contacts 43 or 44 engaged with a contact 32.

In the form of invention illustrated in Figure 8, the signal casing 45a carries the usual tail light 46a and a single stop light 50a that are adapted to be alternately illuminated or flashed during application of the brake mechanism of the motor vehicle while the tail light 46a is continuously illuminated when the stop signal is inoperative and a control switch for the tail light is turned on. The alternate flashing mechanism illustrated in Figure 2 is employed in this form of the invention and the circuit for the tail light 46a includes the battery 62 having one post grounded as at 63 and a wire 64 connected to the other post with a branch wire 65 leading to a terminal 66. A manually operated switch 67 is arranged in the branch wire 65. The armature 68 of a solenoid 69 is in electrical communication with the terminal 66 and carries a contact 70 that normally engages the contact 71 by means of the spring 72 carried by the solenoid 69. The contact 71 is carried by a terminal 73 that has a wire connection 74 with the terminal post 42 and the wire 75 from the terminal post 42 leads to the tail light 46a that is grounded as at 47a.

The wire 64 has a switch 76 therein adapted to be operated by the brake mechanism of a motor vehicle, the wire 64 extending to the wire 77, one section of the latter wire being in communication with the solenoid 69 that in turn is grounded as at 78. The wire 77 extends to the bracket 34 that pivotally supports the contact bar 31. The solenoid 19 associated with the binding post 42 has a wire connection 79 therewith and the solenoid 19 associated with the terminal post 41 has a wire connection 80 therewith. The terminal post 41 has a wire connection 81 with the stop light 50a.

With the manual switch 67 closed, the closing of the switch 76 causes the current to flow over the wire 64 to the solenoid 69 to attract the armature 68 and separate contacts 70 and 71, current flowing over the wire 77 to the bracket 34 and contact bar 31 of the flashing mechanism for alternating contacts 32 into engagement with the contacts 43 and 44 for the alternate illumination or flashing of tail light 46a and the stop light 50a. The operation of the flashing mechanism for the two lights is the same when the manual switch 67 is in open position, the tail light 46a being illuminated by means of the brake operated switch 76 controlling the flow of energy from the battery 62 over the wire 77 to contact bar 31 and contacts 32 and 44.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. In a traffic signal for automobiles, a tail lamp and a stop lamp, a source of electrical energy, electrical circuits forming communication between the source of energy and the lamps, a manually operable switch in the circuit to the tail lamp, a switch in the circuit to the stop lamp adapted to be operated by the brake mechanism of the automobile, means in said circuits rendered operable upon closing of the switch in the stop lamp circuit to effect alternate illumination of the tail and stop lamps, said means including a pair of contacts in the tail lamp circuit and a solenoid in the stop lamp circuit associated with one of said contacts for moving the same away from the other contact when the switch in the stop lamp circuit is closed.

2. In a traffic signal for automobiles, a pair of lamps, a source of electrical energy, electric circuits forming communication between the source of energy and the lamps, a manually operable switch in the circuit to one lamp, a switch in the circuit to the other lamp adapted to be operated by the brake mechanism of the automobile, means in said circuit rendered operable upon closing of the brake mechanism operated switch to effect alternate illumination of the two lamps, said means including a pair of contacts in one circuit and a solenoid in the other circuit associated with one of said contacts for moving the same away from the other contact when the switch in the stop lamp circuit is closed.

OSCAR J. CRAWFORD.
JAMES W. BROWN.